(12) United States Patent
Peringassery Krishnan et al.

(10) Patent No.: US 12,200,192 B2
(45) Date of Patent: Jan. 14, 2025

(54) METHOD AND APPARATUS FOR BI-PREDICTION WITH SAMPLE ADAPTIVE WEIGHTS

(71) Applicant: Tencent America LLC, Palo Alto, CA (US)

(72) Inventors: Madhu Peringassery Krishnan, Mountain View, CA (US); Xin Zhao, San Jose, CA (US); Liang Zhao, Sunnyvale, CA (US); Han Gao, San Diego, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 78 days.

(21) Appl. No.: 17/980,294

(22) Filed: Nov. 3, 2022

(65) Prior Publication Data

US 2024/0015278 A1  Jan. 11, 2024

Related U.S. Application Data

(60) Provisional application No. 63/359,764, filed on Jul. 8, 2022.

(51) Int. Cl.
*H04N 19/105* (2014.01)
*H04N 19/137* (2014.01)
(Continued)

(52) U.S. Cl.
CPC ......... *H04N 19/105* (2014.11); *H04N 19/137* (2014.11); *H04N 19/172* (2014.11); *H04N 19/176* (2014.11); *H04N 19/46* (2014.11)

(58) Field of Classification Search
CPC .. H04N 19/105; H04N 19/137; H04N 19/172; H04N 19/176; H04N 19/46; H04N 19/577
See application file for complete search history.

(56) References Cited

U.S. PATENT DOCUMENTS 9,531,990 B1   12/2016   Wilkins et al.
2018/0098086 A1   4/2018   Chuang et al.
(Continued)

FOREIGN PATENT DOCUMENTS

WO   WO-2019234578 A1 * 12/2019 ........... H04N 19/103

OTHER PUBLICATIONS

"Generalized Bi-prediction Method for Future Video Coding"—Chen et al.; 978-1-5090-5966-9/16/$31.00 A © 2016 IEEE (Year: 2016).*

(Continued)

*Primary Examiner* — Mainul Hasan
(74) *Attorney, Agent, or Firm* — Sughrue Mion, PLLC

(57) ABSTRACT

A method includes receiving a current picture, a first reference picture, and a second reference picture. The method includes obtaining a plurality of predefined weighting patterns, each weighting pattern being signaled as an index value and selecting a weighting pattern based on a predetermined condition. The method includes deriving a first weight to be applied to a first sub-block in the first reference picture and a second weight to be applied to a second sub-block in the second reference picture based on the index value corresponding to the selected weighting pattern. The method includes assigning the first weight to the first sub-block and the second weight to the second sub-block based on the selected weighting pattern. The method includes decoding the current block by a weighted bi-prediction based at least on the first sub-block weighted by the first (Continued)

weight and the second sub-block weighted by the second weight.

20 Claims, 12 Drawing Sheets

(51) Int. Cl.
*H04N 19/172* (2014.01)
*H04N 19/176* (2014.01)
*H04N 19/46* (2014.01)

(56) References Cited

U.S. PATENT DOCUMENTS

| | | |
|---|---|---|
| 2018/0184117 A1 | 6/2018 | Chen et al. |
| 2019/0394459 A1 | 12/2019 | Ye et al. |
| 2020/0213586 A1* | 7/2020 | Han ............... H04N 19/115 |
| 2020/0336749 A1* | 10/2020 | Li ................... H04N 19/577 |
| 2021/0037256 A1 | 2/2021 | Zhang et al. |
| 2021/0195200 A1* | 6/2021 | Chen ............... H04N 19/119 |
| 2022/0312001 A1* | 9/2022 | Chen ............... H04N 19/139 |

OTHER PUBLICATIONS

"Motion Vector Coding and Block Merging in the Versatile Video Coding Standard"—Chien et al., IEEE Transactions on Circuits and Systems for Video Technology, vol. 31, No. 10, Oct. 2021 (Year: 2021).*

International Search Report dated Mar. 10, 2023 in Application No. PCT/US2022/049236.

Written Opinion of the International Searching Authority dated Mar. 10, 2023 in Application No. PCT/US2022/049236.

Mao et al., "Adaptive Weighted Bi-Prediction Based on Template Similarity in Video Coding", 2018 IEEE Visual Communications and Image Processing (VCIP), Retrieved on Feb. 6, 2023, <https://ieeexplore.ieee.org/document/8698636 >, (4 total pages).

* cited by examiner

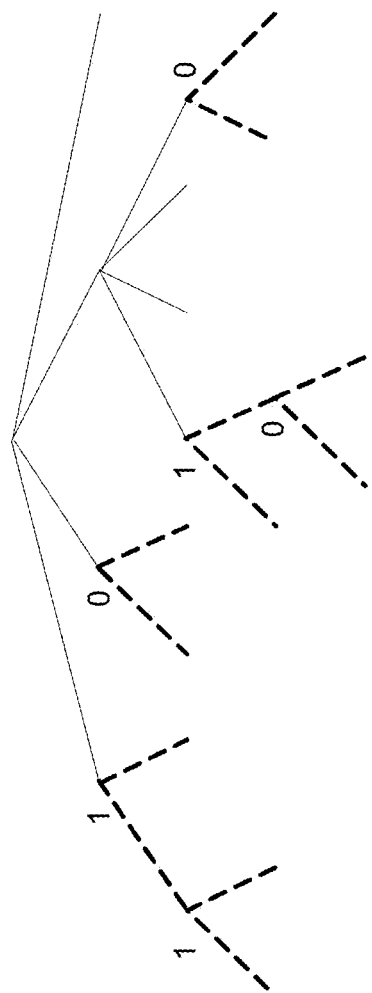
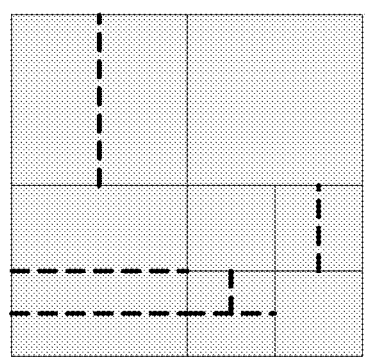
FIG. 6(B)
FIG. 6(A)

| 3 | 3 | 3 | 3 | 3 | 3 | 3 | 3 |
|---|---|---|---|---|---|---|---|
| 3 | 2 | 2 | 2 | 2 | 2 | 2 | 3 |
| 3 | 2 | 1 | 1 | 1 | 1 | 2 | 3 |
| 3 | 2 | 1 | 0 | 0 | 1 | 2 | 3 |
| 3 | 2 | 1 | 0 | 0 | 1 | 2 | 3 |
| 3 | 2 | 1 | 1 | 1 | 1 | 2 | 3 |
| 3 | 2 | 2 | 2 | 2 | 2 | 2 | 3 |
| 3 | 3 | 3 | 3 | 3 | 3 | 3 | 3 |

METHOD AND APPARATUS FOR BI-PREDICTION WITH SAMPLE ADAPTIVE WEIGHTS

CROSS-REFERENCE TO RELATED APPLICATION(S)

This application is based on and claims priority to U.S. Provisional Patent Application No. 63/359,764, filed on Jul. 8, 2022, the disclosure of which is incorporated herein by reference in its entirety.

TECHNICAL FIELD

The present disclosure relates generally to communication systems, and more particularly to methods and apparatuses for bi-prediction with sample adaptive weights.

BACKGROUND

AOMedia Video 1 (AV1) is an open video coding format designed for video transmissions over the Internet. This coding format was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. The current coding for bi-prediction, by sharing a same weighting with all samples in a prediction block, do not adequately account for statistical variability in different positions of the prediction block.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for bi-prediction with sample adaptive weights are disclosed by the present disclosure.

According to an exemplary embodiment, a method performed by at least one processor of a video decoder includes receiving a coded video bitstream including a current picture, a first reference picture, and a second reference picture, the current picture including a current block divided into a plurality of sub-blocks. The method includes determining that the current picture is predicted using a bi-prediction or compound prediction mode based on the first reference picture and the second reference picture. The method includes obtaining a plurality of predefined weighting patterns, each weighting pattern being signaled as an index value. The method includes selecting a weighting pattern based on a predetermined condition. The method includes deriving a first weight to be applied to a first sub-block in the first reference picture and a second weight to be applied to a second sub-block in the second reference picture based on the index value corresponding to the selected weighting pattern. The method includes assigning the first weight to the first sub-block and the second weight to the second sub-block based on the selected weighting pattern. The method further includes decoding the current block by a weighted bi-prediction based at least on the first sub-block weighted by the first weight and the second sub-block weighted by the second weight.

According to exemplary embodiment, a video decoder includes at least one memory configured to store computer program code, and at least one processor configured to access the computer program code and operate as instructed by the computer program code. The computer program code includes receiving code configured to cause the at least one processor to receive a coded video bitstream including a current picture, a first reference picture, and a second reference picture, the current picture including a current block divided into a plurality of sub-blocks. The computer program code includes determining code configured to cause the at least one processor to determine that the current picture is predicted using a bi-prediction or compound prediction mode based on the first reference picture and the second reference picture. The computer program code includes obtaining code configured to cause the at least one processor to obtain a plurality of predefined weighting patterns, each weighting pattern being signaled as an index value. The computer program code includes selecting code configured to cause the at least one processor to select a weighting pattern based on a predetermined condition. The computer program code includes deriving code configured to cause the at least one processor to derive a first weight to be applied to a first sub-block in the first reference picture and a second weight to be applied to a second sub-block in the second reference picture based on the index value corresponding to the selected weighting pattern. The computer program code includes assigning code configured to cause the at least one processor to assign the first weight to the first sub-block and the second weight to the second sub-block based on the selected weighting pattern. The computer program code includes decoding code configured to cause the at least one processor to decode the current block by a weighted bi-prediction based at least on the first sub-block weighted by the first weight and the second sub-block weighted by the second weight.

According to an exemplary embodiment, a non-transitory computer readable medium having instructions stored therein, which when executed by a processor in a video decoder cause the processor to execute a method that includes receiving a coded video bitstream including a current picture, a first reference picture, and a second reference picture, the current picture including a current block divided into a plurality of sub-blocks. The method includes determining that the current picture is predicted using a bi-prediction or compound prediction mode based on the first reference picture and the second reference picture. The method includes obtaining a plurality of predefined weighting patterns, each weighting pattern being signaled as an index value. The method includes selecting a weighting pattern based on a predetermined condition. The method includes deriving a first weight to be applied to a first sub-block in the first reference picture and a second weight to be applied to a second sub-block in the second reference picture based on the index value corresponding to the selected weighting pattern. The method includes assigning the first weight to the first sub-block and the second weight to the second sub-block based on the selected weighting pattern. The method further includes decoding the current block by a weighted bi-prediction based at least on the first sub-block weighted by the first weight and the second sub-block weighted by the second weight.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIGS. 6(A) and 6(B) illustrate an example quad-tree binary tree (QTBT) structure, in accordance with various embodiments of the present disclosure.

FIG. 9 illustrates an example block divided into subblocks with corresponding index values, in accordance with various embodiments of the present disclosure.

DETAILED DESCRIPTION

Figure 1:
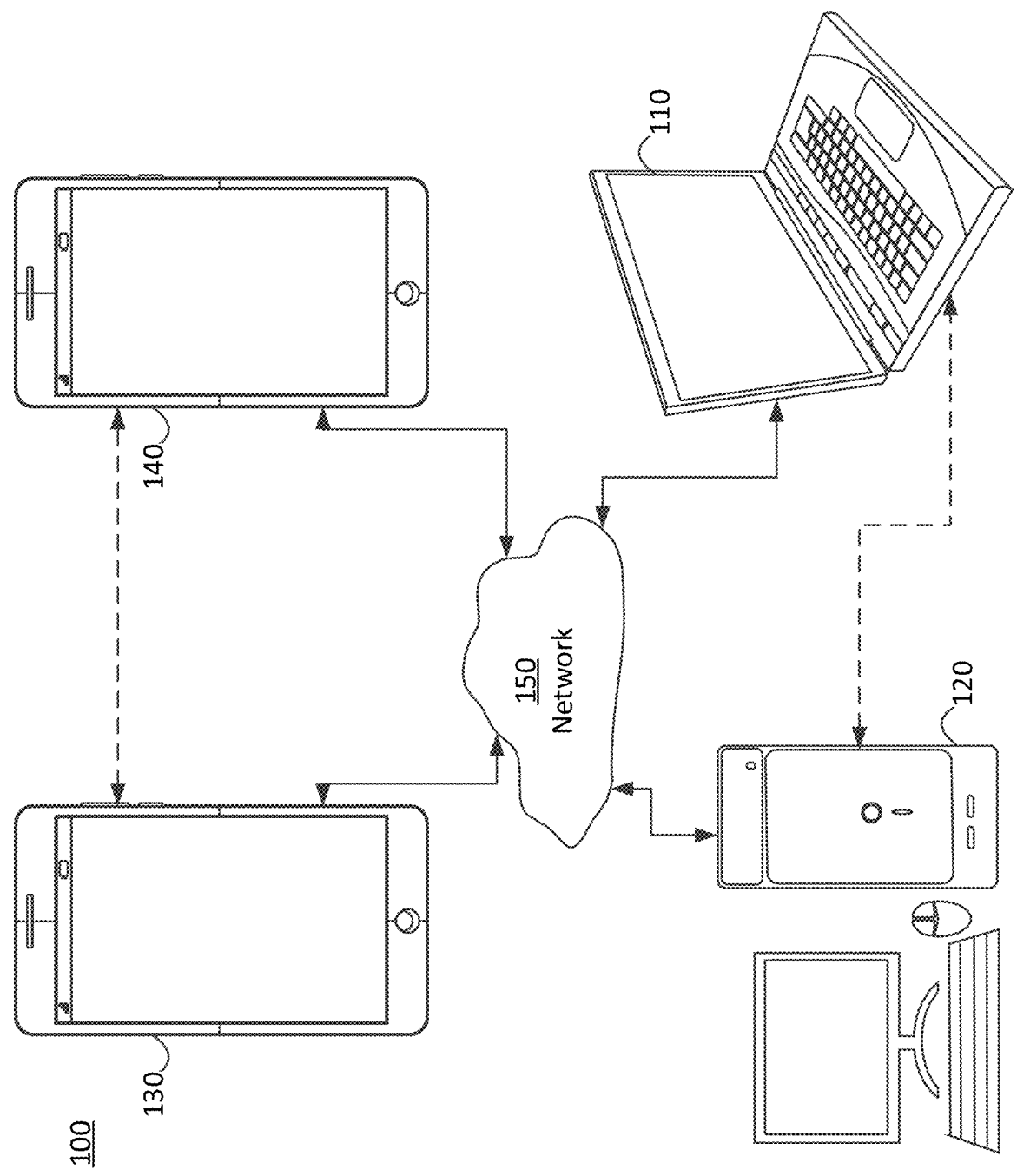
FIG. 1 is a schematic illustration of a block diagram of a communication system, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
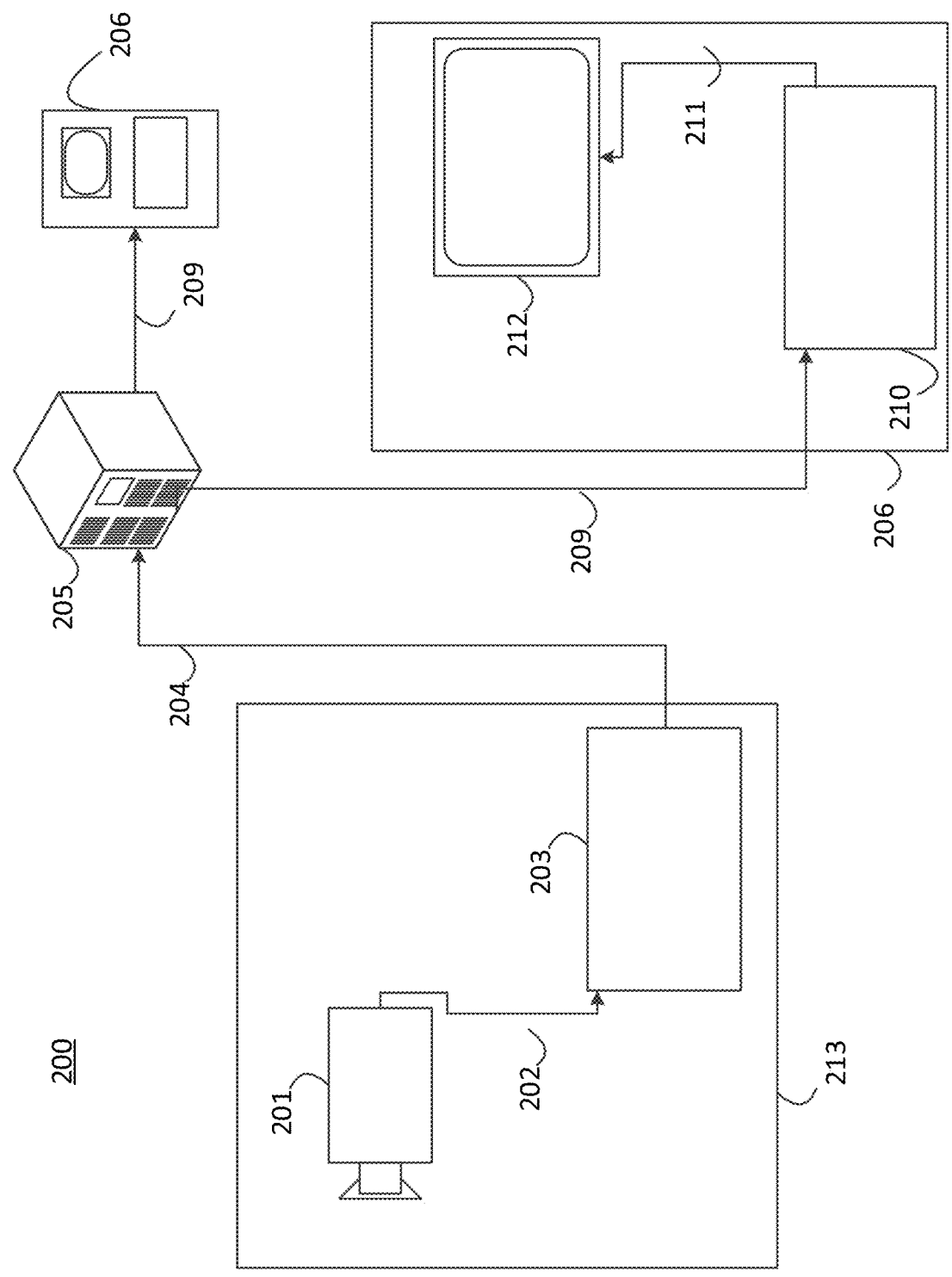
FIG. 2 is a schematic illustration of a block diagram of a communication system, in accordance with various embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
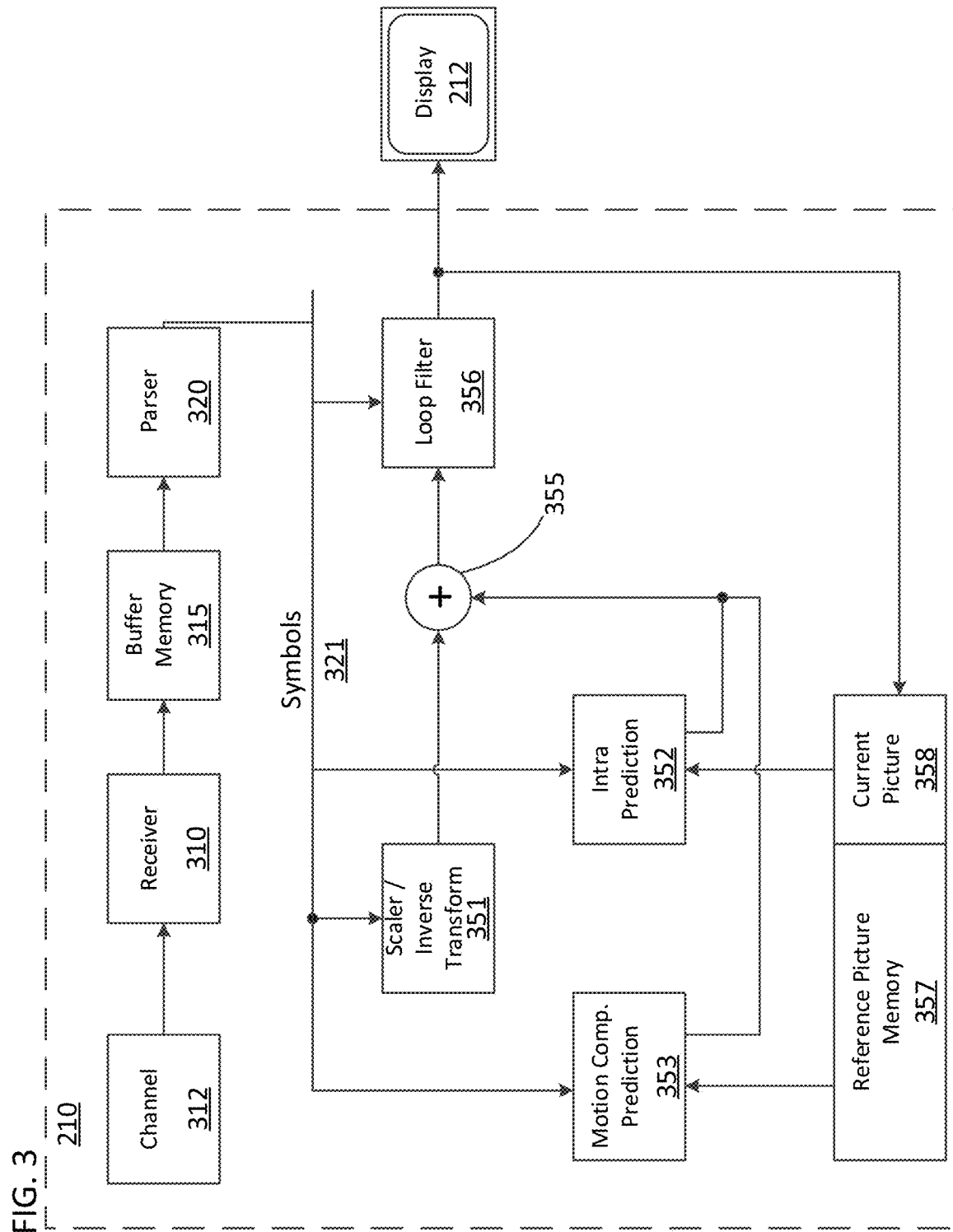
FIG. 3 is a schematic illustration of a block diagram of a decoder, in accordance with various embodiments of the present disclosure.

FIG. 3 illustrates an example functional block diagram of a video decoder (210) that is attached to a display (212) according to an embodiment of the present disclosure. The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321). Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
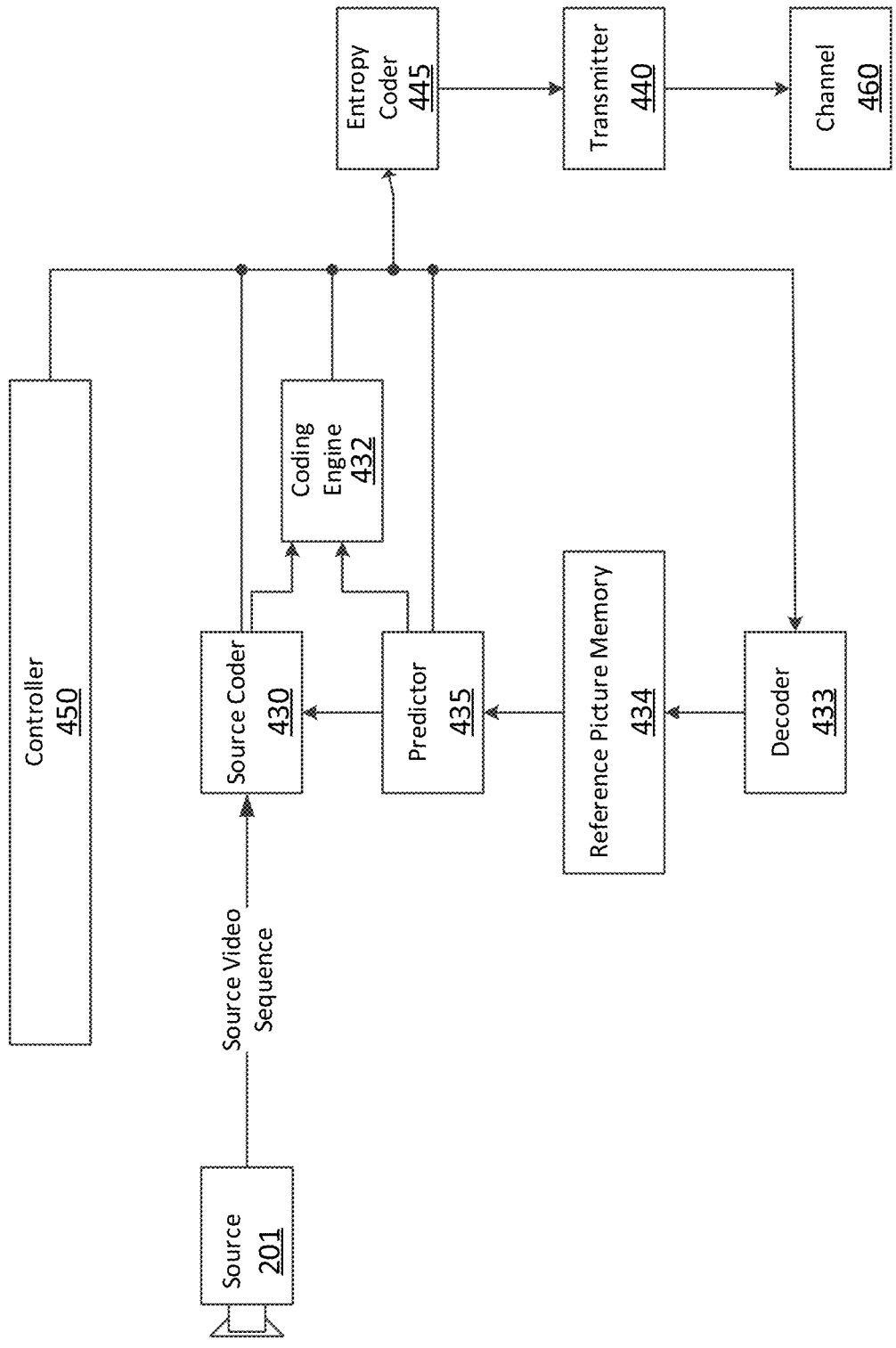
FIG. 4 is a block diagram of an encoder, in accordance with various embodiments of the present disclosure.

FIG. 4 illustrates an example functional block diagram of a video encoder (203) associated with a video source (201) according to an embodiment of the present disclosure. The video encoder (203) may include, for example, an encoder that is a source coder (430), a coding engine (432), a (local)

decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203). The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data. Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown). The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of embodiments of the disclosure in more detail, a few terms are introduced below that are referred to in the remainder of this description.

"Sub-Picture" henceforth refers to, in some cases, a rectangular arrangement of samples, blocks, macroblocks, coding units, or similar entities that are semantically grouped, and that may be independently coded in changed resolution. One or more sub-pictures may form a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

"Adaptive Resolution Change" (ARC) henceforth refers to mechanisms that allow the change of resolution of a picture or sub-picture within a coded video sequence, by the means of, for example, reference picture resampling. "ARC parameters" henceforth refer to the control information required to perform adaptive resolution change, that may include, for example, filter parameters, scaling factors, resolutions of output and/or reference pictures, various control flags, and so forth.

VP9 uses a 4-way partition tree starting from a 64×64 level down to 4×4 level, with some additional restrictions for blocks 8×8 and below as shown in the top half of FIG. 5, which illustrates a partitioning of a 64×64 block (500). The partitions designated as R refer to recursive partitioning in which the same partition tree is repeated at a lower scale until the lowest 4×4 level is reached.

Figure 5:
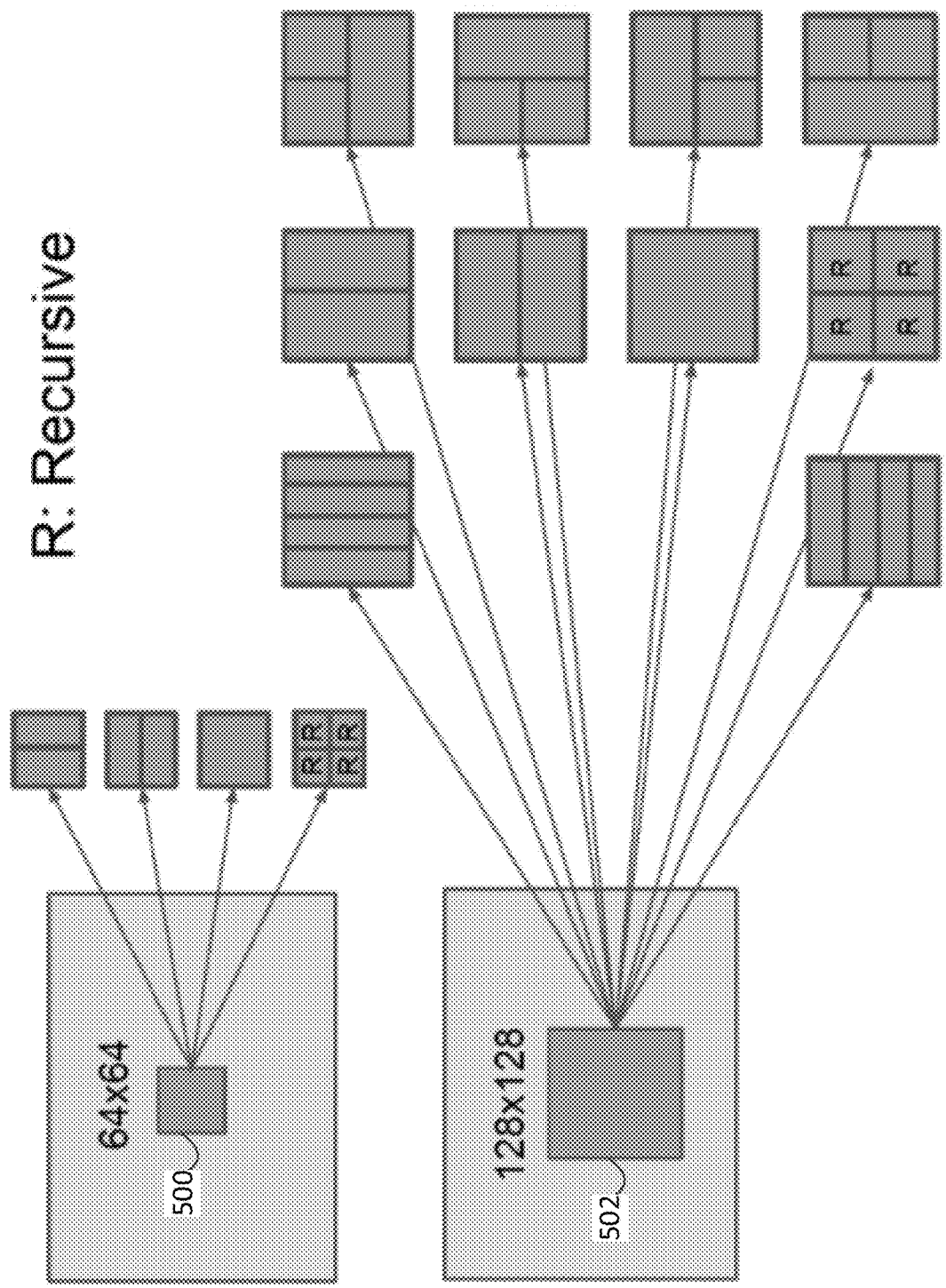
FIG. 5 illustrates example partition trees, in accordance with various embodiments of the present disclosure.

AV1 not only expands the partition-tree to a 10-way structure as shown in FIG. 5, but also increases the largest size (referred to as superblock in VP9/AV1 parlance) to start from a 128×128 block (502). This partitioning includes 4:1/1:4 rectangular partitions that did not exist in VP9. None of the rectangular partitions may be further subdivided. In addition, AV1 adds more flexibility to the use of partitions below the 8×8 level, in the sense that a 2×2 chroma inter prediction now becomes possible in certain cases.

In HEVC, a coding tree unit (CTU) may be split into coding units (CUs) by using a quadtree structure denoted as coding tree to adapt to various local characteristics. The decision on whether to code a picture area using inter-picture (temporal) or intra-picture (spatial) prediction may be made at the CU level. Each CU may be further split into one, two, or four prediction units (PUs) according to the PU splitting type. Inside one PU, the same prediction process may be applied, and the relevant information may be transmitted to the decoder on a PU basis. After obtaining the residual block by applying the prediction process based on the PU splitting type, a CU may be partitioned into transform units (TUs) according to another quadtree structure like the coding tree for the CU. One of key features of the HEVC structure is that this structure has the multiple partition conceptions including CU, PU, and TU. In HEVC, a CU or a TU may only be square shape, while a PU may be square or rectangular shape for an inter predicted block. In HEVC, one coding block may be further split into four square sub-blocks, and a transform may be performed on each sub-block (e.g., TU). Each TU may be further split recursively (e.g., using quadtree split) into smaller TUs, which is called Residual Quad-Tree (RQT). At a picture boundary, HEVC may employ an implicit quad-tree split so that a block will keep quad-tree splitting until the size fits the picture boundary.

In HEVC, a CTU may be split into CUs by using a quadtree structure denoted as coding tree to adapt to various local characteristics. The decision on whether to code a picture area using inter-picture (temporal) or intra-picture (spatial) prediction may be made at the CU level. Each CU may be further split into one, two, or four PUs according to the PU splitting type. Inside one PU, the same prediction process may be applied and the relevant information transmitted to the decoder on a PU basis. After obtaining the residual block by applying the prediction process based on the PU splitting type, a CU may be partitioned into transform units (TUs) according to another quadtree structure like the coding tree for the CU. One of key features of the HEVC structure is that this structure has the multiple partition conceptions including CU, PU, and TU.

The QTBT structure may remove the concepts of multiple partition types (e.g. QTBT structure removes the separation of the CU, PU, and TU concepts), and supports more flexibility for CU partition shapes. In the QTBT block structure, a CU may have either a square or rectangular shape. As shown in FIGS. 6(A) and (6B), a coding tree unit (CTU) may be first partitioned by a quadtree structure. The quadtree leaf nodes may be further partitioned by a binary tree structure. There may two splitting types in the binary tree splitting, symmetric horizontal splitting and symmetric vertical splitting. The binary tree leaf nodes may be called coding units (CUs), and that segmentation may be used for prediction and transform processing without any further partitioning. This means that the CU, PU, and TU have the same block size in the QTBT coding block structure. In the JEM, a CU sometimes consists of coding blocks (CBs) of different colour components. For example, one CU contains one luma CB and two chroma CBs in the case of P and B slices of the 4:2:0 chroma format and sometimes consists of a CB of a single component. For example, one CU contains only one luma CB or just two chroma CBs in the case of I slices. The following parameters are defined for the QTBT partitioning scheme:

- CTU size: the root node size of a quadtree, the same concept as in HEVC
- MinQTSize: the minimum allowed quadtree leaf node size
- MaxBTSize: the maximum allowed binary tree root node size
- MaxBTDepth: the maximum allowed binary tree depth
- MinBTSize: the minimum allowed binary tree leaf node size In one example of the QTBT partitioning structure, the CTU size may be set as 128×128 luma samples with two corresponding 64×64 blocks of chroma samples, the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from 16×16 (e.g., the MinQTSize) to 128×128 (e.g., the CTU size). If the leaf quadtree node is 128×128, the node may not be further split by the binary tree since the size exceeds the MaxBTSize (e.g., 64×64). Otherwise, the leaf quadtree node may be further partitioned by the binary tree. Therefore, the quadtree leaf node may also be the root node for the binary tree with the binary tree depth as 0. When the binary tree depth reaches MaxBTDepth (e.g., 4), no further splitting is considered. When the binary tree node has a width equal to MinBTSize (e.g., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 6(A) illustrates an example of block partitioning by using QTBT, and FIG. 6(B) illustrates the corresponding tree representation. The solid lines indicate quadtree splitting and dotted lines indicate binary tree splitting. In each splitting (e.g., non-leaf) node of the binary tree, one flag may be signalled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme may support the flexibility for the luma and chroma to have a separate QTBT structure. Currently, for P and B slices, the luma and chroma CTBs in one CTU share the same QTBT structure. However, for I slices, the luma CTB may be partitioned into CUs by a QTBT structure, and the chroma CTBs may be partitioned into chroma CUs by another QTBT structure. This means that a CU in an I slice may consist of a coding block of the luma component or coding blocks of two chroma components, and a CU in a P or B slice may consist of coding blocks of all three colour components.

In HEVC, inter prediction for small blocks may be restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions may be removed.

Figure 7B:
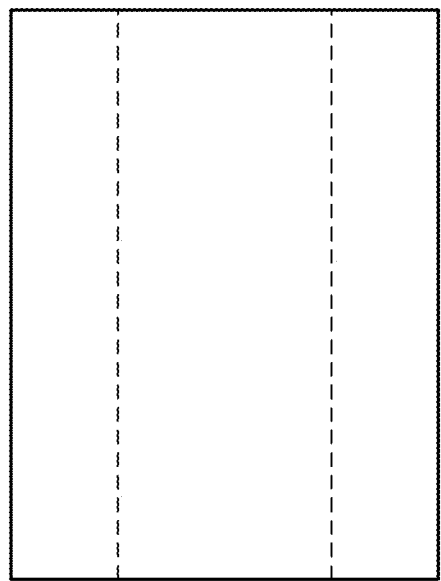
FIGS. 7(A) and 7(B) illustrate a ternary tree (TT) structure, in accordance with various embodiments of the present disclosure.
Figure 7A:
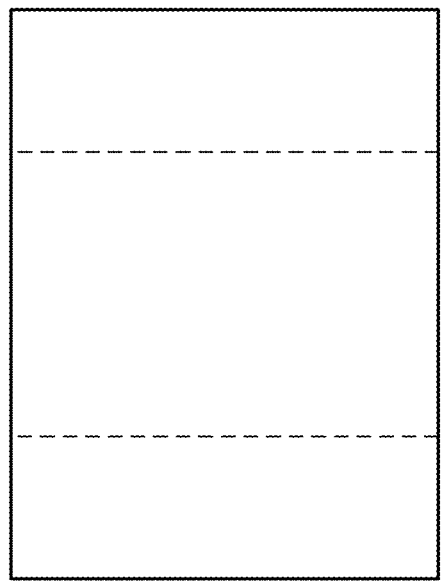

In VVC, a Multi-type-tree (MTT) structure may be included, which further adds the horizontal and vertical center-side triple-trees on top of QTBT, as shown in FIGS. 7(A) and 7(B).

The key benefits of the triple-tree partitioning include (i) complement to quad-tree and binary-tree partitioning: triple-tree partitioning is able to capture objects which locate in block center while quad-tree and binary-tree are always splitting along block center; and (ii) the width and height of the partitions of the proposed triple trees are always power of 2 so that no additional transforms are needed. The design of two-level tree is mainly motivated by complexity reduction. The complexity of traversing of a tree is $T^D$, where T denotes the number of split types, and D is the depth of tree.

In HEVC, the bi-prediction signal may be generated by averaging two prediction signals obtained from two different reference pictures and/or using two different motion vectors. In VVC, the bi-prediction mode may be extended beyond simple averaging to allow weighted averaging of the two prediction signals.

$$P_{bi\text{-}pred} = ((8-w)*P_0 + w*P_1 + 4) \gg 3 \qquad \text{Eq. (1)}$$

Five weights may be allowed in the weighted averaging bi-prediction, $w \in \{-2, 3, 4, 5, 10\}$. For each bi-predicted CU, the weight w may be determined in one of two ways: 1) for a non-merge CU, the weight index is signalled after the motion vector difference; 2) for a merge CU, the weight index is inferred from neighbouring blocks based on the merge candidate index. BCW may only be applied to CUs with 256 or more luma samples (e.g., CU width times CU height is greater than or equal to 256). For low-delay pictures, all 5 weights may be used. For non-low-delay pictures, only 3 weights ($w \in \{3,4,5\}$) may be used.

At the encoder, fast search algorithms may be applied to find the weight index without significantly increasing the encoder complexity. These algorithms are summarized as follows. When combined with AMVR, unequal weights may be only conditionally checked for 1-pel and 4-pel motion vector precisions if the current picture is a low-delay picture.

When combined with affine, affine ME may be performed for unequal weights if and only if the affine mode is selected as the current best mode. When the two reference pictures in bi-prediction are the same, unequal weights may be only conditionally checked. Unequal weights may not be searched when certain conditions are met, depending on the POC distance between current picture and its reference pictures, the coding QP, and the temporal level.

The BCW weight index may be coded using one context coded bin followed by bypass coded bins. The first context coded bin may indicate if an equal weight is used. If an unequal weight is used, additional bins may be signalled using bypass coding to indicate which unequal weight is used. Weighted prediction (WP) is a coding tool supported by the H.264/AVC and HEVC standards to efficiently code video content with fading. Support for WP was also added into the VVC standard. WP may allow weighting parameters (weight and offset) to be signalled for each reference picture in each of the reference picture lists L0 and L1. Then, during motion compensation, the weight(s) and offset(s) of the corresponding reference picture(s) may be applied. WP and BCW may be designed for different types of video content. To avoid interactions between WP and BCW, which will complicate VVC decoder design, if a CU uses WP, then the BCW weight index is not signalled, and w is inferred to be 4 (i.e. equal weight is applied).

For a merge CU, the weight index may be inferred from neighbouring blocks based on the merge candidate index. This feature may be applied to both normal merge mode and inherited affine merge mode. For constructed affine merge mode, the affine motion information may be constructed based on the motion information of up to 3 blocks. The BCW index for a CU using the constructed affine merge mode may be set equal to the BCW index of the first control point MV. In VVC, CIIP and BCW cannot be jointly applied for a CU. When a CU is coded with CIIP mode, the BCW index of the current CU may be set to 2 (e.g., equal weight).

With the current design of BCW, the weightings applied on the two prediction blocks are either signaled explicitly or inherited from neighboring blocks. However, all the samples in the prediction block share the same weighting. This sharing is suboptimal as there could be statistical variability in different positions of the prediction block. Thus, sample adaptive weighing (or position dependent weighting) may be used to derive a final predictor when BCW is applied to a coded block. This concept can also be extended to situations where neighboring reconstruction (or prediction) samples of the coded blocks may be used to estimate the weightings to save the signaling overhead.

Embodiments of the present disclosure are directed to a set of advanced image and video coding technologies. More specifically, the embodiments of the present disclosure are directed to a bi-prediction method using sample adaptive weights for inter coding. The embodiments of the present disclosure may be applied to bi-prediction motion compensation on top of VVC, or compound prediction mode on top of AV1, since both bi-prediction motion compensation and compound prediction mode use multiple reference frames.

The embodiments of the present disclosure may be used separately or combined in any order. Further, each of the embodiments utilizing an encoder or a decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit (i.e., CU). The term block may also be used to refer to the transform block.

Figure 8:
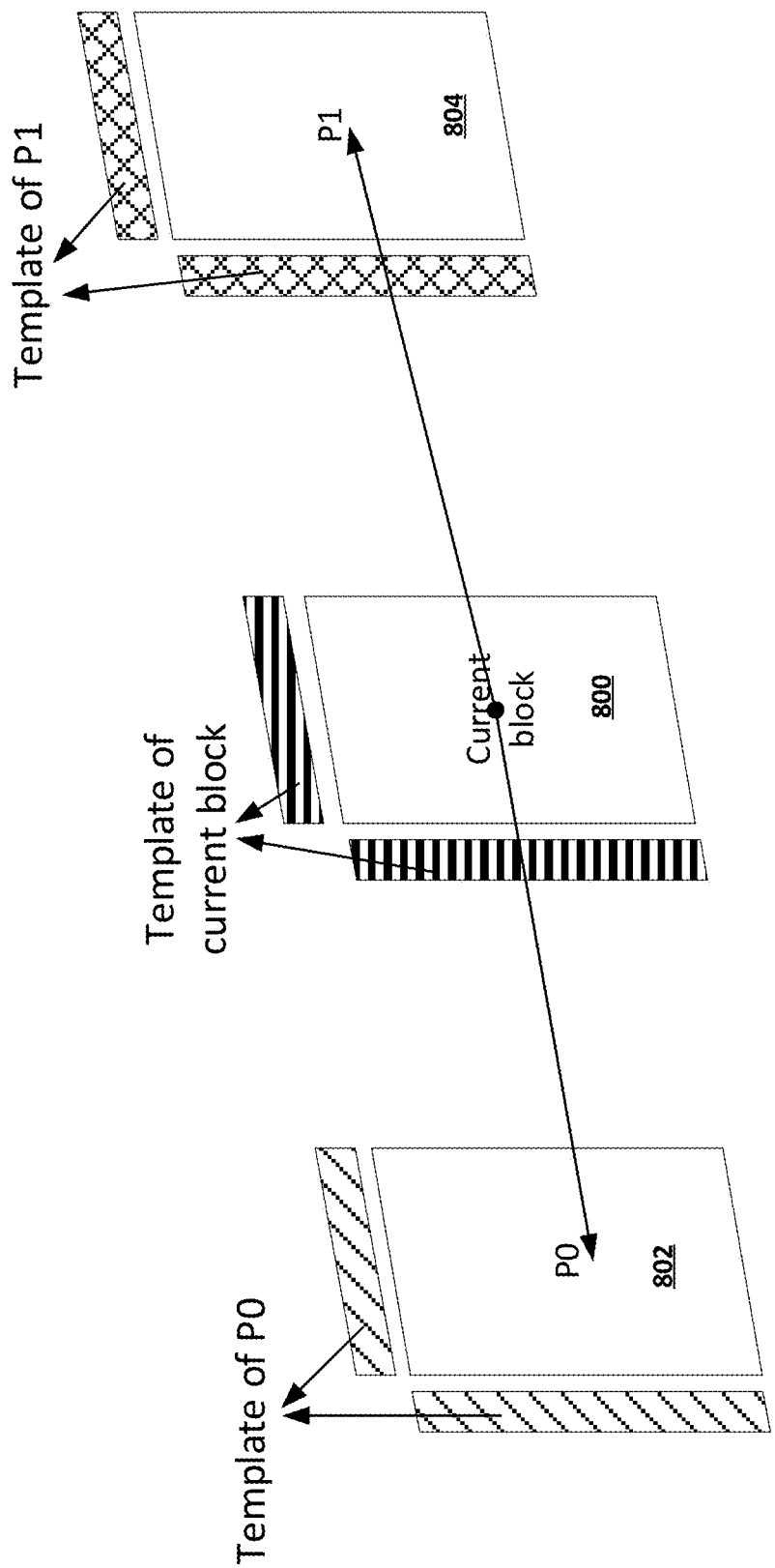
FIG. 8 illustrates example templates, in accordance with various embodiments of the present disclosure.

The neighboring reconstructed samples of the current block, the forward prediction block, and/or backward prediction block may also be referred as a template of current block, template of the forward prediction block, and/or template of the backward prediction block. Examples of templates are illustrated in FIG. 8, which illustrate current block (800), P0 block (802), and P1 block (804) with corresponding templates. The templates may indicate the neighboring reconstructed samples indicated as the textured part.

In some embodiments, the weightings applied to the list 0 and/or list 1 prediction blocks in bi-prediction motion compensation may depend on the position of samples in the predicted block. In some embodiments (first weighting mode), a group of weighting patterns may be pre-defined, and an index value may be associated with each weighting pattern in the group. The index value may be signaled in the bitstream. The decoder may apply the weighting pattern associated with the index for bi-prediction motion compensation.

In some embodiments (second weighting mode), a group of weighting patterns are pre-defined, and the weighting pattern that minimizes a pre-defined cost measurement calculated using the templates of the current block and a prediction block may be selected without any signaling. At both the encoder and decoder, the weightings may be directly calculated using the neighboring reconstructed samples of the current block and the forward and/or backward neighboring reconstructed samples.

In one example, the weightings may be derived using least mean-square error based on neighboring reconstruction samples. The samples in template of P0, P1 and current block may be represented as vector $\vec{x}$, $\vec{y}$ and $\vec{z}$, respectively. To find the best weighting a and (1−a) that are applied to P0 and P1 for generating the prediction block, the following cost may be minimized:

$$D=\Sigma_{i=0}^{N-1}(a \cdot x_i+(1-a) \cdot y_i+b-z_i)^2, \qquad \text{Eq. (2)}$$

where N is total number of samples in the template. The solution is given as follows:

$$a = \frac{\sum_{i=0}^{N-1}(z_i - y_i)(x_i - y_i)}{\sum_{i=0}^{N-1}(x_i - y_i)^2} \qquad \text{Eq. (3)}$$

In another example, the weightings may be derived using least mean-square error based on neighboring reconstruction samples. The samples in template of P0, P1 and current block may be represented as vector and i, respectively. To find the best weighting a and (1−a) that are applied to P0 and P1 for generating the prediction block, the following cost may be minimized:

$$D=\Sigma_{i=0}^{N-1}(a \cdot x_i+(1-a) \cdot y_i+b-z_i)^2, \qquad \text{Eq. (4)}$$

where N is total number of samples in the template. The solution may be given as follows:

$$\begin{bmatrix} a \\ b \end{bmatrix} = (M^T M)^{-1} M^T \vec{n} \qquad \text{Eq. (5)}$$

-continued $$\text{where } M = \begin{bmatrix} x_0 - y_0 & 1 \\ \cdots & \cdots \\ x_{N-1} - y_{N-1} & 1 \end{bmatrix}, \vec{n} = \begin{bmatrix} z_0 - y_0 & 1 \\ \cdots & \cdots \\ z_{N-1} - y_{N-1} & 1 \end{bmatrix} \quad \text{Eq. (6)}$$

In some embodiments (third weighting mode), the weighting pattern for a current block may be inherited by the weighting pattern from neighboring blocks. For example, if the current block is coded with NEARMV or merge mode, the weighting pattern may be inherited from one of the neighboring block. The rules for selection of neighboring blocks may be predefined.

In some embodiments, the final predictor for a current block may be generated using one of the aforementioned first weighting mode, second weighting mode, and third weighting mode. For example, the bitstream may include a flag or indicator that indicates one of first weighting mode, second weighting mode, and third weighting mode for a block.

In some embodiments, one flag may be signaled to indicate whether equal weight is applied to combine the prediction samples in list 0 and list 1. If unequal weights is selected/indicated, then one of the first weighting mode and the second weighting mode may be further applied to indicate a per-sample weighting.

In some embodiments, one flag may be signaled to indicate whether equal weight is applied to combine the prediction samples in list 0 and list 1. If unequal weighting is selected/indicated, a second flag may be signaled (or derived) to indicate whether the block level weighting factor (e.g., all the samples in one block share the same weighting factor) or the sample position dependent weighting factor is used. If sample position dependent weighting factor is used/indicated, then one of the first weighting mode and the second weighting mode may be further applied.

In some embodiments, the weighting value applied on a sample in list 0 and list 1 prediction blocks depend on the distance between the position of a given sample (denoted as $p_{ij}$) and the center sample (denoted as $p_c$). As an example, the distance may be measured by a max absolute value of the difference between the horizontal and vertical coordinates of $p_{ij}$ and $p_c$. FIG. 9 illustrates a block (900) divided into a plurality of sub-blocks. Each sub-block may be referred to as a sample. As illustrated in FIG. 9, samples labeled with a same index value may apply the same weighting value.

Figure 10:
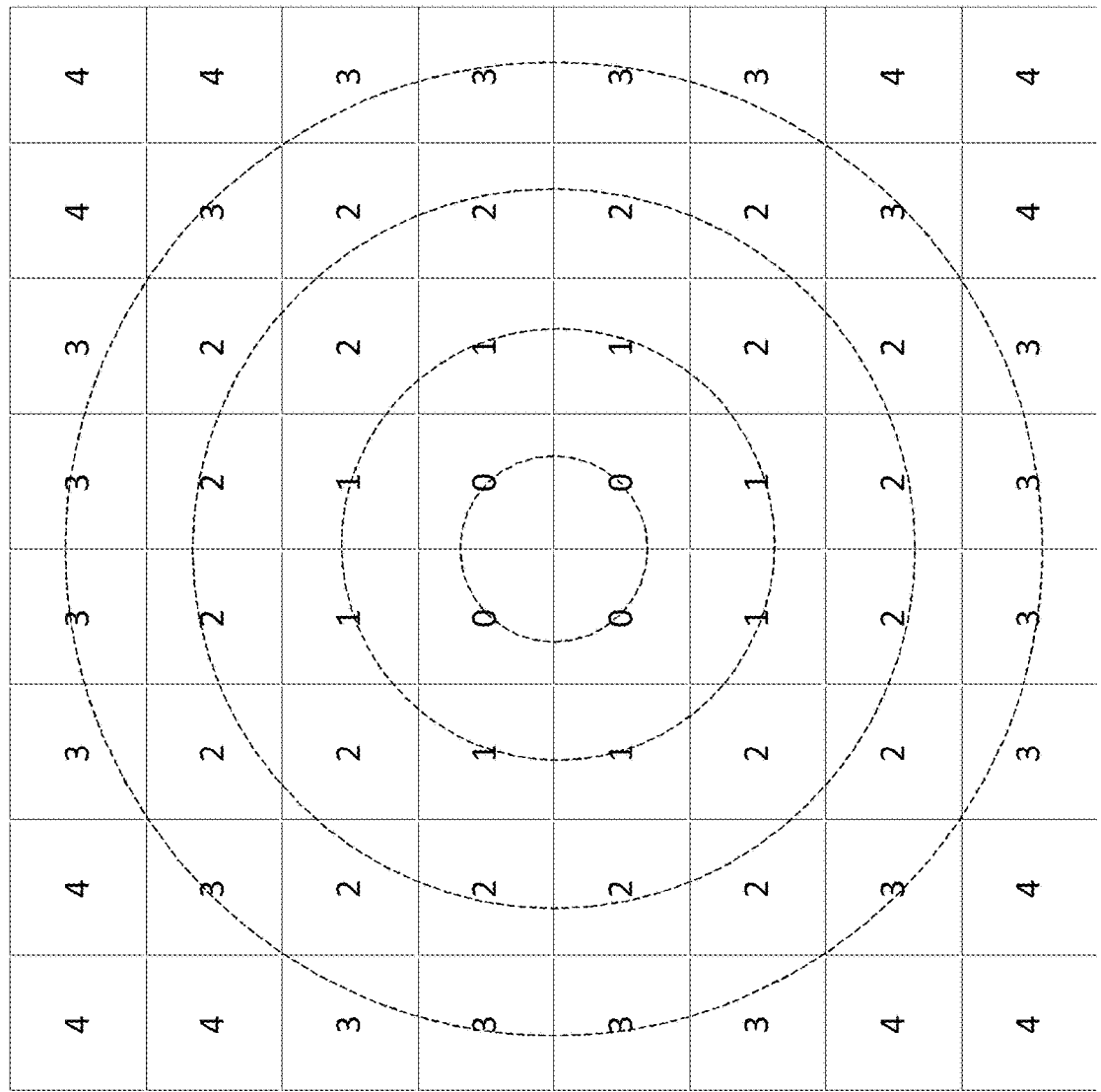
FIG. 10 illustrates an example block divided into subblocks with corresponding index values, in accordance with various embodiments of the present disclosure.

In another example, the distance may be measured by a quantized distance value between horizontal and vertical coordinates of $p_{ij}$ and $p_c$. As illustrated in FIG. 10, samples of block (1000) labeled with the same index value may apply the same weighting value.

In some embodiments, the position of a sample closer to a center position of a block may be associated with a weighting that is further from (or closer to) equal weighting (0.5). In some embodiments, the position of a sample closer to the template positions (top or left neighbors of the current block) may be associated with a weighting that is further from (or closer to) equal weighting (0.5). In some embodiments, there may be multiple patterns of per-sample weightings and the selection may be signaled or implicitly derived.

In some embodiments, the weighting value may depend on the horizontal coordinate. In some embodiments, the weighting value may depend on the vertical coordinate. In some embodiments, the weighting may value depend on the sum or difference between the horizontal and vertical coordinates.

In some embodiments, the above-mentioned weighting methods may be excluded with (but not limited to) frame- or higher-level weighted prediction, BDOF, wedge-based prediction (or GPM), or DMVR. That is, when those modes are enabled for the current coding block, the block level simple average may be used instead of the introduced adaptive sample weighting.

Figure 11:
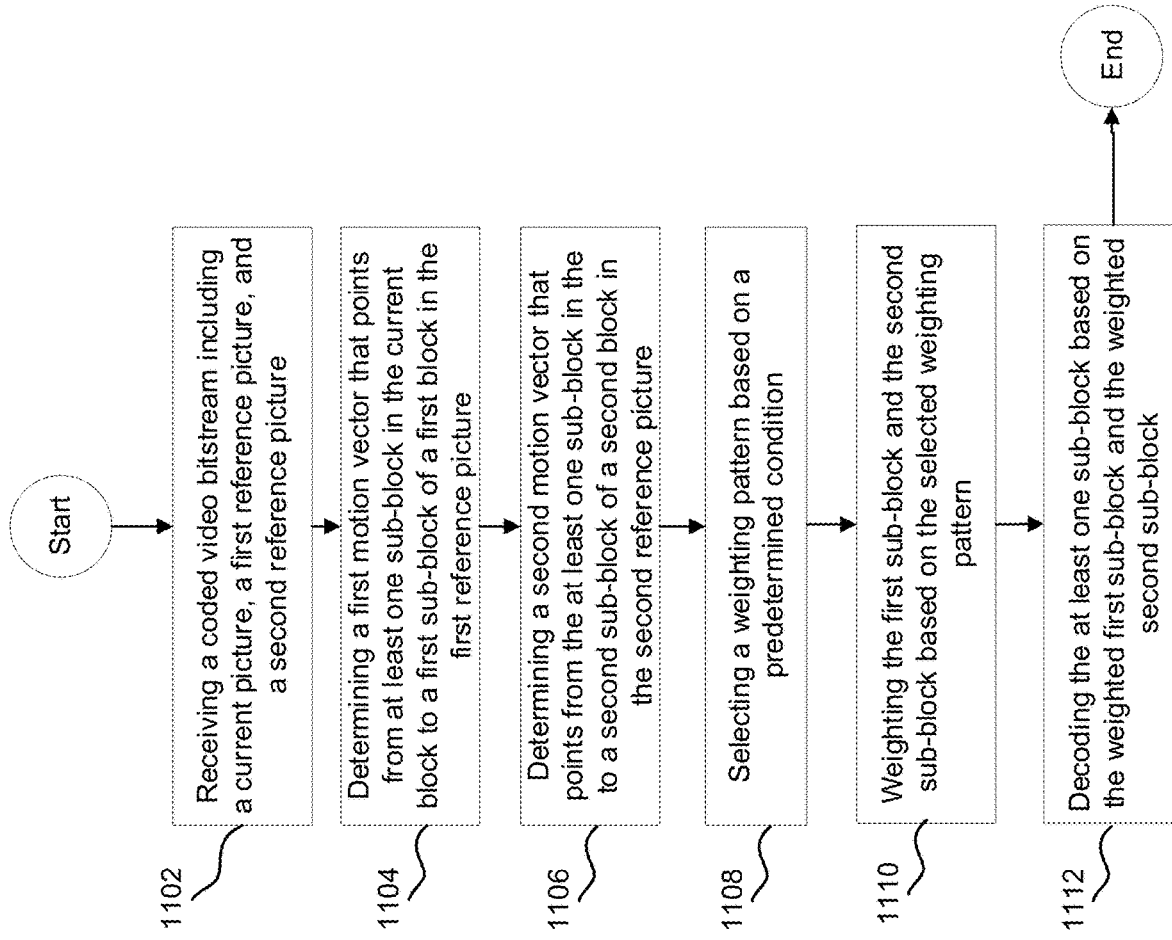
FIG. 11 illustrates a flow chart of an embodiment of a process for performing bi-prediction with adaptive weighting, in accordance with various embodiments of the present disclosure.

FIG. 11 illustrates a flowchart of an embodiment of a process (1100) for performing bi-prediction with adaptive weighting. The process (1100) may be performed by a decoder such as decoder (210). The process may start at operation (1102) where a coded video bitstream is received. The bitstream may include a current picture, a first reference picture, and a second reference picture. The current picture may include a current block that is divided into a plurality of sub-blocks.

The process proceeds to operation (1104) where a first motion vector that points from at least one sub-block in the current block to a first sub-block of a first block in the first reference picture is determined. The process proceeds to operation (1106) where a second motion vector that points from the at least one sub-block in the current block to a second sub-block of a second block in the second reference picture is determined.

The process proceeds to operation (1108) where a weighting pattern is selected based on a predetermined condition. For example, one of the aforementioned first weighting mode, second weighting mode, and third weighting mode may be selected. The process proceeds to operation (1110) where the first sub-block and the second sub-block are weighted based on the selected weighting pattern. The process proceeds to operation (1112) where the at least one sub-block is decoded based on the weighted first sub-block and the weighted second sub-block.

The techniques of embodiments of the present disclosure described above, can be implemented as computer software using computer-readable instructions and physically stored in one or more computer-readable media. For example, FIG. 12 shows a computer system (1200) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
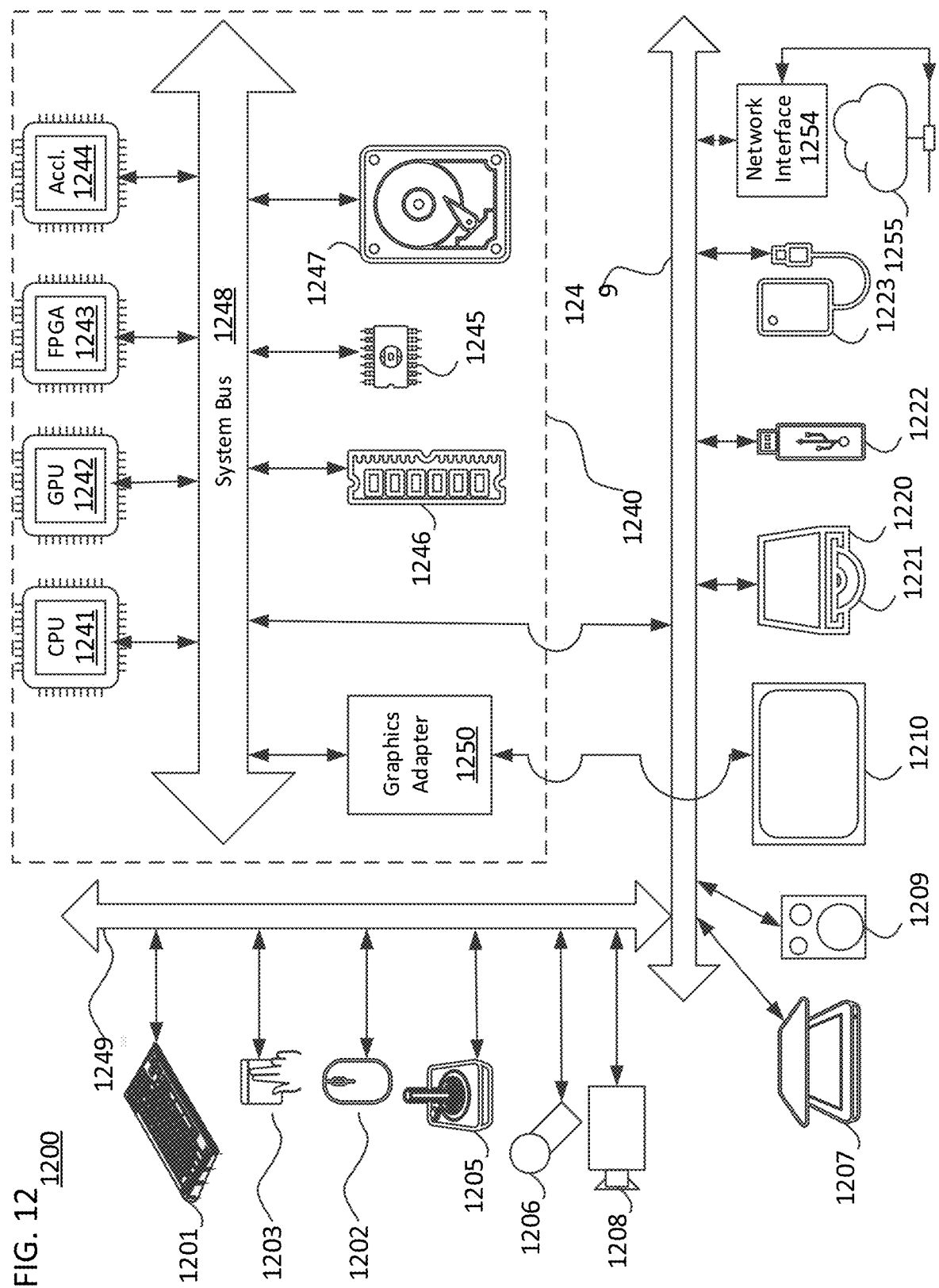
FIG. 12 illustrates an example computer system, in accordance with various embodiments of the present disclosure.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove, joystick (1205), microphone (1206), scanner (1207), and camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove, or joystick (1205), but there can also be tactile feedback devices that do not serve as input devices). For example, such devices may be audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200); others are commonly integrated into the core of the computer system 1200 by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (1255). Certain protocols and protocol stacks can be used on each of those networks and network interfaces as described above.

Aforementioned human interface devices, human-accessible storage devices, and network interfaces (1254) can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators (1244) for certain tasks, and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like. A graphics adapter (1250) may be included in the core (1240).

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein.

Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor of a video decoder, the method including: receiving a coded video bitstream including a current picture, a first reference picture, and a second reference picture, the current picture including a current block divided into a plurality of sub-blocks; determining that the current picture is predicted using a bi-prediction or compound prediction mode based on the first reference picture and the second reference picture; obtaining a plurality of predefined weighting patterns, each weighting pattern being signaled as an index value; selecting a weighting pattern based on a predetermined condition; deriving a first weight to be applied to a first sub-block in the first reference picture and a second weight to be applied to a second sub-block in the second reference picture based on the index value corresponding to the selected weighting pattern; assigning the first weight to the first sub-block and the second weight to the second sub-block based on the selected weighting pattern; and decoding the current block by a weighted bi-prediction based at least on the first sub-block weighted by the first weight and the second sub-block weighted by the second weight.

(2) The method according to feature (1), in which the predetermined condition specifies a selection index included in the coded video bitstream, and in which the weighting pattern is selected from a plurality of the weighting patterns, based on the selection index.

(3) The method of feature (1), in which the predetermined condition specifies a minimum cost measurement for selecting the weighting pattern from a plurality of weighting patterns, and in which the cost measurement is calculated based on a template associated with the at least one sub-block, a template associated with the first sub-block, and a template associated with the second sub-block.

(4) The method of feature (1), in which the predetermined condition indicates a weighting pattern of a neighboring sub-block that neighbors the at least one sub-block.

(5) The method of feature (1), in which the predetermined condition indicates a plurality weighting modes including: (i) a first weighting mode in which the weighting pattern is selected from a plurality of weighting patterns based on an index included in the bitstream, (ii) a second weighting mode in which the weighting pattern is selected from a plurality of weighting patterns that minimizes a cost measurement that is calculated based on a template associated with the at least one sub-block, a template associated with the first sub-block, and a template associated with the second sub-block, (iii) a third weighting mode in which the weighting pattern is selected based on a weighting pattern of a neighboring sub-block that neighbors the at least one sub-block.

(6) The method of feature (5), in which the selection of the one of the plurality of weighting modes is based on an indicator included in the bitstream.

(7) The method of feature (5), in which the bitstream includes a first flag that indicates whether the selected weighting pattern applies equal weighting to the first sub-block and the second sub-block, and in which based on a determination that the first flag indicates an unequal weighting, a second flag is included in the bitstream or is derived, the second flag indicating selection of one of the first weighting mode and the second weighting mode.

(8) The method of feature (7), in which the bitstream includes a first flag that indicates whether the selected weighting pattern applies equal weighting to the first sub-block and the second sub-block, in which based on a determination that the first flag indicates unequal weighting, a second flag is included in the bitstream or is derived, the second flag indicating whether all sub-blocks in the at least one sub-block share a same weighting pattern, and in which based on a determination that the second flag indicates all the sub-blocks do not share the same weighting pattern, one of the first weighting mode and the second weighting mode is selected.

(9) The method of feature (7), in which the predetermined condition indicates a distance of the at least one sub-block to a center of the current block, and the weighting pattern is selected based on the distance.

(10) The method of feature (9), in which the distance is measured by a max absolute value of a difference between horizontal and vertical coordinates of the at least one sub-block and the center of the current block.

(11) The method of feature (9), in which the distance is measured by a quantized distance value between horizontal and vertical coordinates of the at least one sub-block and the center of the current block.

(12) The method of feature (9), in which a first distance between the at least one sub-block and the center of the current block that is closer to the center of the current block than a second distance has a first weighting pattern that is closer to equal weighting of the first sub-block and the second sub-block than a second weighting pattern associated with second distance.

(13) The method of any one of features (1)-(12), further including: determining a first motion vector that points from at least one sub-block in the current block to a first sub-block of a first block in the first reference picture; and determining a second motion vector that points from the at least one sub-block in the current block to a second sub-block of a second block in the second reference picture.

(14) A video decoder including: at least one memory configured to store computer program code; and at least one processor configured to access the computer program code and operate as instructed by the computer program code, the computer program code including: receiving code configured to cause the at least one processor to receive a coded video bitstream including a current picture, a first reference picture, and a second reference picture, the current picture including a current block divided into a plurality of sub-blocks, determining code configured to cause the at least one processor to determine that the current picture is predicted using a bi-prediction or compound prediction mode based on the first reference picture and the second reference picture, obtaining code configured to cause the at least one processor to obtain a plurality of predefined weighting patterns, each weighting pattern being signaled as an index value, selecting code configured to cause the at least one processor to select a weighting pattern based on a predetermined condition, deriving code configured to cause the at least one processor to derive a first weight to be applied to a first sub-block in the first reference picture and a second weight to be applied to a second sub-block in the second reference picture based on the index value corresponding to the selected weighting pattern, assigning code configured to cause the at least one processor to assign the first weight to the first sub-block and the second weight to the second sub-block based on the selected weighting pattern, and decoding code configured to cause the at least one processor to decode the current block by a weighted bi-prediction based at least on the first sub-block weighted by the first weight and the second sub-block weighted by the second weight.

(15) The video decoder according to feature (14), in which the predetermined condition specifies a selection index included in the coded video bitstream, and in which the weighting pattern is selected from a plurality of the weighting patterns based on the selection index.

(16) The video decoder of feature (14), in which the predetermined condition specifies a minimum cost measurement for selecting the weighting pattern from a plurality of weighting patterns, and in which the cost measurement is calculated based on a template associated with the at least one sub-block, a template associated with the first sub-block, and a template associated with the second sub-block.

(17) The video decoder of feature (14), in which the predetermined condition indicates a weighting pattern of a neighboring sub-block that neighbors the at least one sub-block.

(18) The video decoder of feature (14), in which the predetermined condition indicates a plurality weighting modes including: (i) a first weighting mode in which the weighting pattern is selected from a plurality of weighting patterns based on an index included in the bitstream, (ii) a second weighting mode in which the weighting pattern is selected from a plurality of weighting patterns that minimizes a cost measurement that is calculated based on a template associated with the at least one sub-block, a template associated with the first sub-block, and a template associated with the second sub-block, (iii) a third weighting mode in which the weighting pattern is selected based on a weighting pattern of a neighboring sub-block that neighbors the at least one sub-block.

(19) The video decoder of feature (18), in which the selection of the one of the plurality of weighting modes is based on an indicator included in the bitstream.

(20) A non-transitory computer readable medium having instructions stored therein, which when executed by a processor in a video decoder cause the processor to execute a method including: receiving a coded video bitstream including a current picture, a first reference picture, and a second reference picture, the current picture including a current block divided into a plurality of sub-blocks; determining that the current picture is predicted using a bi-prediction or compound prediction mode based on the first reference picture and the second reference picture; obtaining a plurality of predefined weighting patterns, each weighting pattern being signaled as an index value; selecting a weighting pattern based on a predetermined condition; deriving a first weight to be applied to a first sub-block in the first reference picture and a second weight to be applied to a second sub-block in the second reference picture based on the index value corresponding to the selected weighting pattern; assigning the first weight to the first sub-block and the second weight to the second sub-block based on the selected weighting pattern; and decoding the current block by a weighted bi-prediction based at least on the first sub-block weighted by the first weight and the second sub-block weighted by the second weight.

What is claimed is:

1. A method performed by at least one processor of a video decoder, the method comprising:
   receiving a coded video bitstream including a current picture, a first reference picture, and a second reference picture, the current picture including a current block divided into a plurality of sub-blocks;
   determining that the current picture is predicted using a bi-prediction or compound prediction mode based on the first reference picture and the second reference picture;
   obtaining a plurality of predefined weighting patterns, each weighting pattern being signaled as an index value;
   selecting a weighting pattern based on a predetermined condition, wherein the predetermined condition indicates that the weigh pattern is selected from at least one of:
      (i) a first weighting pattern selected from a plurality of weighting patterns based on a selection index included in the bitstream,
      (ii) a second weighting pattern selected from a plurality of weighting patterns that minimizes a cost measurement, and
      (iii) a third weighting pattern selected based on a weighting pattern of a neighboring sub-block that neighbors the at least one sub-block;
   deriving, based on the index value corresponding to the selected weighting pattern, a first weight to be applied to a first sub-block in the first reference picture and a second weight to be applied to a second sub-block in the second reference picture;
   assigning the first weight to the first sub-block and the second weight to the second sub-block based on the selected weighting pattern; and
   decoding the current block by a weighted bi-prediction based at least on the first sub-block weighted by the first weight and the second sub-block weighted by the second weight,
   wherein the bitstream includes a first flag that indicates whether the selected weighting pattern applies equal weighting to the first sub-block and the second sub-block, and wherein based on a determination that the first flag indicates an unequal weighting, a second flag indicates selection of one of the first weighting pattern and the second weighting pattern.

2. The method according to claim 1, wherein the predetermined condition specifies a selection index included in the coded video bitstream, and wherein the weighting pattern is selected from a plurality of the weighting patterns based on the selection index.

3. The method of claim 1, wherein the predetermined condition specifies a minimum cost measurement for selecting the weighting pattern from a plurality of weighting patterns, and wherein the cost measurement is calculated based on a template associated with the at least one sub-block, a template associated with the first sub-block, and a template associated with the second sub-block.

4. The method of claim 1, wherein the predetermined condition indicates a weighting pattern of a neighboring sub-block that neighbors the at least one sub-block.

5. The method of claim 1, wherein the
cost measurement is calculated based on a template associated with the at least one sub-block, a template associated with the first sub-block, and a template associated with the second sub-block.

6. The method of claim 5, wherein the selection of the one of the first weighting pattern, the second weighting pattern, and the third weighting pattern is based on an indicator included in the bitstream.

7. The method of claim 5, wherein the second flag is included in the bitstream or is derived.

8. The method of claim 7, wherein the bitstream includes a first flag that indicates whether the selected weighting pattern applies equal weighting to the first sub-block and the second sub-block,
wherein based on a determination that the first flag indicates unequal weighting, a second flag is included in the bitstream or is derived, the second flag indicating whether all sub-blocks in the at least one sub-block share a same weighting pattern, and
wherein based on a determination that the second flag indicates all the sub-blocks do not share the same weighting pattern, one of the first weighting mode and the second weighting mode is selected.

9. The method of claim 7, wherein the predetermined condition indicates a distance of the at least one sub-block to a center of the current block, and the weighting pattern is selected based on the distance.

10. The method of claim 9, wherein the distance is measured by a max absolute value of a difference between horizontal and vertical coordinates of the at least one sub-block and the center of the current block.

11. The method of claim 9, wherein the distance is measured by a quantized distance value between horizontal and vertical coordinates of the at least one sub-block and the center of the current block.

12. The method of claim 9, wherein a first distance between the at least one sub-block and the center of the current block that is closer to the center of the current block than a second distance has a first weighting pattern that is closer to equal weighting of the first sub-block and the second sub-block than a second weighting pattern associated with second distance.

13. The method of claim 1, further comprising:
determining a first motion vector that points from at least one sub-block in the current block to a first sub-block of a first block in the first reference picture; and
determining a second motion vector that points from the at least one sub-block in the current block to a second sub-block of a second block in the second reference picture.

14. A video decoder comprising:
at least one memory configured to store computer program code; and
at least one processor configured to access the computer program code and operate as instructed by the computer program code, the computer program code including:
receiving code configured to cause the at least one processor to receive a coded video bitstream including a current picture, a first reference picture, and a second reference picture, the current picture including a current block divided into a plurality of sub-blocks,
determining code configured to cause the at least one processor to determine that the current picture is predicted using a bi-prediction or compound prediction mode based on the first reference picture and the second reference picture,
obtaining code configured to cause the at least one processor to obtain a plurality of predefined weighting patterns, each weighting pattern being signaled as an index value,
selecting code configured to cause the at least one processor to select a weighting pattern based on a predetermined condition,
(i) a first weighting pattern selected from a plurality of weighting patterns based on a selection index included in the bitstream,
(ii) a second weighting pattern selected from a plurality of weighting patterns that minimizes a cost measurement, and
(iii) a third weighting pattern selected based on a weighting pattern of a neighboring sub-block that neighbors the at least one sub-block,
deriving code configured to cause the at least one processor to derive, based on the index value corresponding to the selected weighting pattern, a first weight to be applied to a first sub-block in the first reference picture and a second weight to be applied to a second sub-block in the second reference picture,
assigning code configured to cause the at least one processor to assign the first weight to the first sub-block and the second weight to the second sub-block based on the selected weighting pattern, and
decoding code configured to cause the at least one processor to decode the current block by a weighted bi-prediction based at least on the first sub-block weighted by the first weight and the second sub-block weighted by the second weight,
wherein the bitstream includes a first flag that indicates whether the selected weighting pattern applies equal weighting to the first sub-block and the second sub-block, and wherein based on a determination that the first flag indicates an unequal weighting, a second flag indicates selection of one of the first weighting pattern and the second weighting pattern.

15. The video decoder according to claim 14, wherein the predetermined condition specifies a selection index included in the coded video bitstream, and wherein the weighting pattern is selected from a plurality of the weighting patterns based on the selection index.

16. The video decoder of claim 14, wherein the predetermined condition specifies a minimum cost measurement for selecting the weighting pattern from a plurality of weighting patterns, and wherein the cost measurement is calculated based on a template associated with the at least one sub-block, a template associated with the first sub-block, and a template associated with the second sub-block.

17. The video decoder of claim 14, wherein the predetermined condition indicates a weighting pattern of a neighboring sub-block that neighbors the at least one sub-block.

18. The video decoder of claim 14, wherein the
cost measurement is calculated based on a template associated with the at least one sub-block, a template associated with the first sub-block, and a template associated with the second sub-block.

19. The video decoder of claim 18, wherein the selection of the one of the first weighting pattern, the second weighting pattern, and the third weighting pattern is based on an indicator included in the bitstream.

20. A non-transitory computer readable medium having instructions stored therein, which when executed by a processor in a video decoder cause the processor to execute a method comprising:
- receiving a coded video bitstream including a current picture, a first reference picture, and a second reference picture, the current picture including a current block divided into a plurality of sub-blocks;
- determining that the current picture is predicted using a bi-prediction or compound prediction mode based on the first reference picture and the second reference picture;
- obtaining a plurality of predefined weighting patterns, each weighting pattern being signaled as an index value;
- selecting a weighting pattern based on a predetermined condition, wherein the predetermined condition indicates that the weigh pattern is selected from at least one of:
  - (i) a first weighting pattern selected from a plurality of weighting patterns based on a selection index included in the bitstream,
  - (ii) a second weighting pattern selected from a plurality of weighting patterns that minimizes a cost measurement, and
  - (iii) a third weighting pattern selected based on a weighting pattern of a neighboring sub-block that neighbors the at least one sub-block;
- deriving, based on the index value corresponding to the selected weighting pattern, a first weight to be applied to a first sub-block in the first reference picture and a second weight to be applied to a second sub-block in the second reference picture;
- assigning the first weight to the first sub-block and the second weight to the second sub-block based on the selected weighting pattern; and
- decoding the current block by a weighted bi-prediction based at least on the first sub-block weighted by the first weight and the second sub-block weighted by the second weight,
- wherein the bitstream includes a first flag that indicates whether the selected weighting pattern applies equal weighting to the first sub-block and the second sub-block, and wherein based on a determination that the first flag indicates an unequal weighting, a second flag indicates selection of one of the first weighting pattern and the second weighting pattern.

* * * * *